（12） United States Patent
Prasad et al.

(10) Patent No.: US 9,337,906 B2
(45) Date of Patent: May 10, 2016

(54) FEEDBACK AND SCHEDULING FOR COORDINATED MULTI-POINT (COMP) JOINT TRANSMISSION (JT) IN ORTHOGONAL FREQUENCY DIVISION MULTIPLE ACCESS (OFDMA)

(71) Applicant: NEC Laboratories America, Inc., Princeton, NJ (US)

(72) Inventors: Narayan Prasad, Wyncote, PA (US); Guosen Yue, Plainsboro, NJ (US); Sampath Rangarajan, Bridgewater, NJ (US); Meilong Jiang, Plainsboro, NJ (US)

(73) Assignee: NEC Corporation (JP)

( * ) Notice: Subject to any disclaimer, the term of this patent is extended or adjusted under 35 U.S.C. 154(b) by 2 days.

(21) Appl. No.: 13/845,623

(22) Filed: Mar. 18, 2013

(65) Prior Publication Data

US 2014/0133325 A1 May 15, 2014

Related U.S. Application Data

(60) Provisional application No. 61/617,854, filed on Mar. 30, 2012.

(51) Int. Cl.
*H04B 7/02* (2006.01)
*H04L 1/00* (2006.01)
*H04W 72/12* (2009.01)
*H04B 7/06* (2006.01)

(52) U.S. Cl.
CPC ............. *H04B 7/024* (2013.01); *H04L 1/0026* (2013.01); *H04B 7/063* (2013.01); *H04B 7/065* (2013.01); *H04B 7/0632* (2013.01); *H04B 7/0639* (2013.01); *H04W 72/1231* (2013.01)

(58) Field of Classification Search
CPC ..................................................... H04B 7/024
See application file for complete search history.

(56) References Cited

U.S. PATENT DOCUMENTS 8,855,026 B2 * 10/2014 Maattanen et al. ........... 370/278

OTHER PUBLICATIONS

S. Brueck, L. Zhao, J. Giese, and M. Amin, "Centralized scheduling for joint transmission coordinated multi-point in lte-advanced," in Smart Antennas (WSA), 2010 International ITG Workshop on, Feb. 2010, pp. 177-184.
L. Thiele, V. Jungnickel, and T. Haustein, "Interference management for future cellular ofdma systems using coordinated multi-point transmission," IEICE Transactions on Communications, vol. E93-B, No. 12, pp. 3228-3237, 2010.

(Continued)

*Primary Examiner* — Jason Mattis
(74) *Attorney, Agent, or Firm* — Joseph Kolodka

(57) ABSTRACT

A method implemented in a user equipment (UE) used in an orthogonal frequency division multiple access (OFDMA) wireless communications system supporting coordinated multi-point (CoMP) joint transmission (JT) is disclosed. The method includes measuring reference signal received power (RSRP), transmitting, to a network, first feedback on the RSRP, receiving, from the network, a CoMP measurement set, conducting pre-scheduling CoMP UE fallback according to the CoMP measurement set, computing channel quality and direction information according to a UE category, and transmitting, to the network, second feedback on the channel quality and direction information. Other methods, apparatuses, and systems also are disclosed.

12 Claims, 3 Drawing Sheets

(56) References Cited

OTHER PUBLICATIONS

Coordinated multi-point operation for LTE physical layer aspects (Release 11), 3GPP Std. 3GPP TR 36.819, Rev. 11.0, 2011.

LG Electronics, Motorola Mobility, et, al Proposal for UE receiver assumption in CoMP simulations, 3GPP TSG-RAN WG1 R1-110586, 2011.

Further advancements for E-UTRA physical layer aspects, 3GPP Std. 3GPP TR 36.814, Rev. 9.0, 2010.

* cited by examiner

FEEDBACK AND SCHEDULING FOR COORDINATED MULTI-POINT (COMP) JOINT TRANSMISSION (JT) IN ORTHOGONAL FREQUENCY DIVISION MULTIPLE ACCESS (OFDMA)

This application claims the benefit of U.S. Provisional Application No. 61/617,854, entitled "Effective Feedback and Scheduling for Cooperative Joint Transmission in Multi-Cell OFDMA Systems," filed on Mar. 30, 2012, the contents of which are incorporated herein by reference.

BACKGROUND OF THE INVENTION

The present invention relates to coordinated multi-point (CoMP) joint transmission (JT) in orthogonal frequency division multiple access (OFDMA) for a wireless communications system and more particularly to feedback and scheduling for CoMP JT in OFDMA.

Coordinated multi-point (CoMP) transmission, being standardized in Third Generation Partnership Project Long Term Evolution Advanced (3GPP LTE-Advanced), allows multi-cell cooperative processing to mitigate inter-cell interference (ICI) and the system to operate at higher effective signal-to-interference-plus-noise ratios (SINRs). Joint transmission (JT) CoMP transmission increases the user throughput especially cell edge users by jointly coordinating the transmission or receptions of user signals from multiple cooperating transmission points (TP).

The benefits of JT CoMP come at the cost of increased radio feedback and backhaul overhead. In addition, CoMP JT performance highly depends on the scheduling algorithms.

We proposes efficient feedback schemes with reduced signaling overhead and efficient scheduling algorithm. Based on the proposed feedback and scheduling, CoMP JT achieves significant cell-edge throughput gain over single cell transmission at the cost of much reduced feedback overhead and backhaul overhead.

There are some related works [1]-[5] in this field. Existing feedback [1] involves very high feedback overhead. The CoMP JT scheduling proposed in [2] involves high complexity due to the iterative design. The performance of the scheduling is not guaranteed with a suboptimal solution.
[1] S. Brueck, L. Zhao, J. Giese, and M. Amin, "Centralized scheduling for joint transmission coordinated multi-point in lte-advanced," in Smart Antennas (WSA), 2010 International ITG Workshop on, February 2010, pp. 177-184.
[2] L. Thiele, V. Jungnickel, and T. Haustein, "Interference management for future cellular ofdma systems using coordinated multi-point transmission," IEICE Transactions on Communications, vol. E93-B, no. 12, pp. 3228-3237, 2010.
[3] Coordinated multi-point operation for LTE physical layer aspects (Release 11), 3GPP Std. 3GPP TR 36.819, Rev. 11.0, 2011.
[4] LG Electronics, Motorola Mobility, et, al "Proposal for UE receiver assumption in CoMP simulations, 3GPP TSG-RAN WG1 R1-110586, 2011.
[5] Further advancements for E-UTRA physical layer aspects, 3GPP Std. 3GPP TR 36.814, Rev. 9.0, 2010.

In [1] and [2], the CoMP JT scheduling algorithm either applies greedy suboptimal scheme or involves iterative scheme, which has very complexity without a performance guarantee. [3] defines the CoMP feedback for JT, in which coherent phase difference information is considered. [5] defines the CQI/PMI/RI feedback format without giving the method to compute them.

We propose and investigate different feedback schemes with lower signaling overhead such as non-coherent JT and pre-scheduling CoMP user equipment (UE) fallback (PS-CUF). With non-coherent JT, no phase adjustment feedback is needed for joint transmission. With PSCUF, a scheme dynamically allowing a CoMP UE to skip CoMP feedback and fallback to single cell transmission is enabled to reduce feedback overhead and maintain the throughput advantage of JT. Based on the proposed feedback option, we develop an optimal scheduling algorithm to achieve CoMP gain at a lower complexity.

BRIEF SUMMARY OF THE INVENTION

An objective is to provide effective feedback and/or scheduling for coordinated multi-point (CoMP) joint transmission (JT) in orthogonal frequency division multiple access (OFDMA) for a wireless communications system.

An aspect of the disclosure includes a method implemented in a user equipment (UE) used in an orthogonal frequency division multiple access (OFDMA) wireless communications system supporting coordinated multi-point (CoMP) joint transmission (JT). The method includes measuring reference signal received power (RSRP), transmitting, to a network, first feedback on the RSRP, receiving, from the network, a CoMP measurement set, conducting pre-scheduling CoMP UE fallback according to the CoMP measurement set, computing channel quality and direction information according to a UE category, and transmitting, to the network, second feedback on the channel quality and direction information.

Another aspect of the disclosure includes a method implemented in an network used in an orthogonal frequency division multiple access (OFDMA) wireless communications system supporting coordinated multi-point (CoMP) joint transmission (JT). The method includes receiving, from a user equipment (UE), first feedback on reference signal received power (RSRP), determining a CoMP measurement set according to the first feedback, transmitting, to the UE, the CoMP measurement set, receiving, from the UE, second feedback on channel quality and direction information, and scheduling CoMP JT according to the second feedback.

Still another aspect of the disclosure includes a method implemented in an orthogonal frequency division multiple access (OFDMA) wireless communications system supporting coordinated multi-point (CoMP) joint transmission (JT). The method includes measuring reference signal received power (RSRP), transmitting, from a user equipment (UE) to a network, first feedback on the RSRP, determining a CoMP measurement set according to the first feedback, transmitting, from the network to the UE, the CoMP measurement set, conducting pre-scheduling CoMP UE fallback according to the CoMP measurement set, computing channel quality and direction information according to a UE category, transmitting, from the UE to the network, second feedback on channel quality and direction information, and scheduling CoMP JT according to the second feedback.

DETAILED DESCRIPTION

Our proposed feedback schemes and scheduling algorithm for CoMP-JT can have the following advantages and competitive and/or commercial values as follows:

(1) The proposed pre-scheduling CoMP UE fallback (PS-CUF) scheme reduces feedback overhead.

(2) The proposed non-coherent JT (without phase adjustment feedback) reduces feedback overhead.

(3) The proposed scheduling algorithm achieves a guaranteed performance at low complexity.

(4) The proposed pre-scheduling CoMP UE fallback (PS-CUF) increases cell-edge UE throughput.

(5) The proposed scheme can be easily extended to multi-user (MU-) multiple-input multiple-output (MIMO) CoMP JT.

1. System Description

We consider a cluster of M TPs with a total K user equipments (UEs) within the cluster. There are N available physical resource blocks (PRBs) in cluster that are available for resource allocation. We assume a centralized scheduler which allocates the PRB resources and transmission formats (transmit precoding matrices, modulations and coding rates) to the users within the cluster in order to optimize the cluster weighted sum rate. The input of the scheduler consists of the available PRBs and the users' channel quality information including a channel quality index (CQI), a precoding matrix index (PMI), and a rank index (RI) fed back to the network from the K UEs within the cluster.

Figure 1:
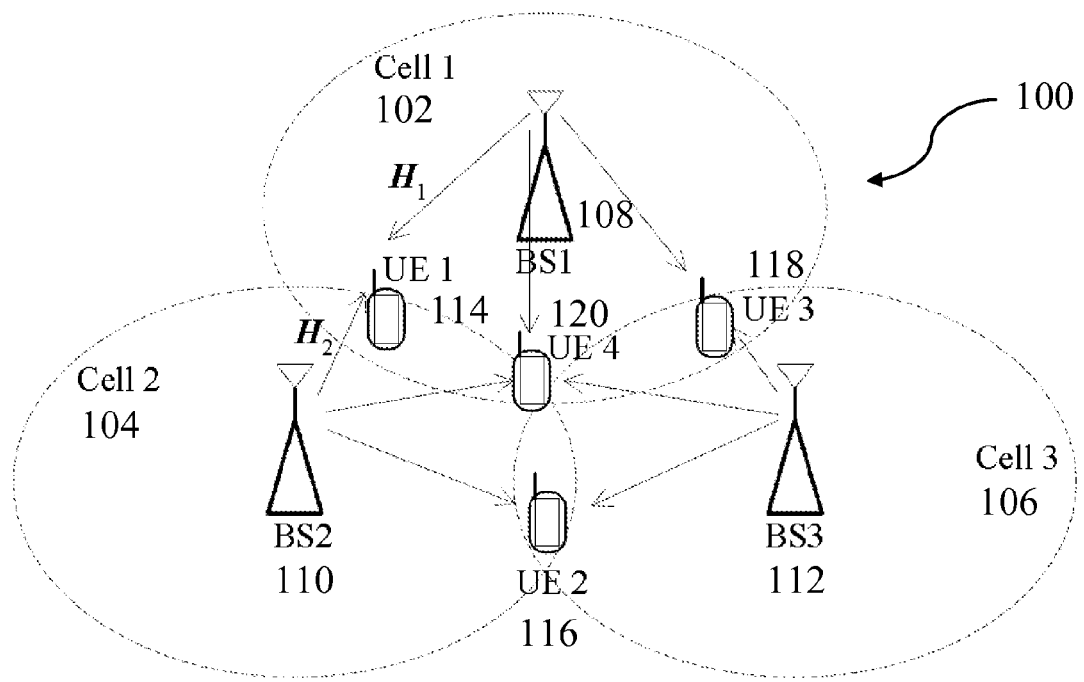
FIG. 1 depicts a homogenous CoMP network with M=3 macrocell base stations (BSs).
Figure 2:
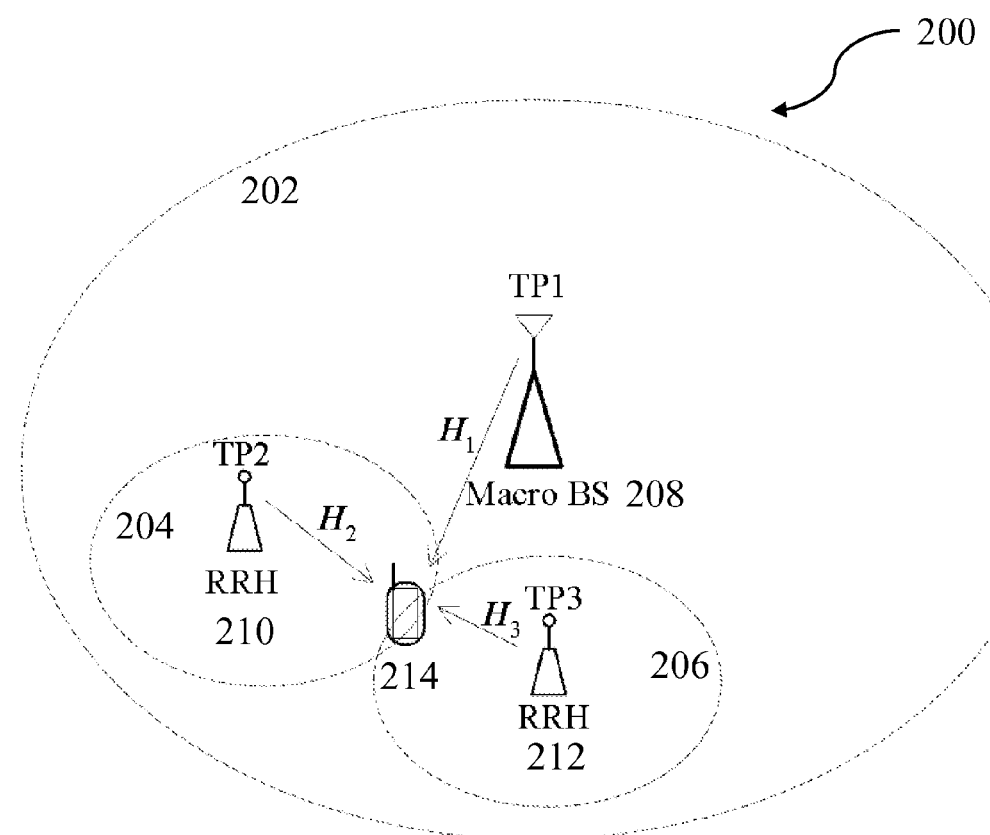
FIG. 2 depicts a heterogeneous CoMP network with 1 Macro cell and M remote radio heads (RRHs).

The CoMP network could be a homogeneous network consisting of all macro-cell BSs, i.e., homogeneous network 100, as shown in FIG. 1 or heterogeneous network (HetNet) 200 which is mixture of macro-cell BSs 208 and lower power RRHs 210 and 212 as shown in FIG. 2.

We consider the heterogeneous network (HetNet) as shown in FIG. 2. For simplicity, we consider single-user (SU) joint-transmission (JT) CoMP scheme, in which maximally only one UE can be scheduled for any resource element (RE) within the cluster. Thus, the UE will experience only the co-channel interference from the TPs outside its CoMP cooperating set.

Figure 3:
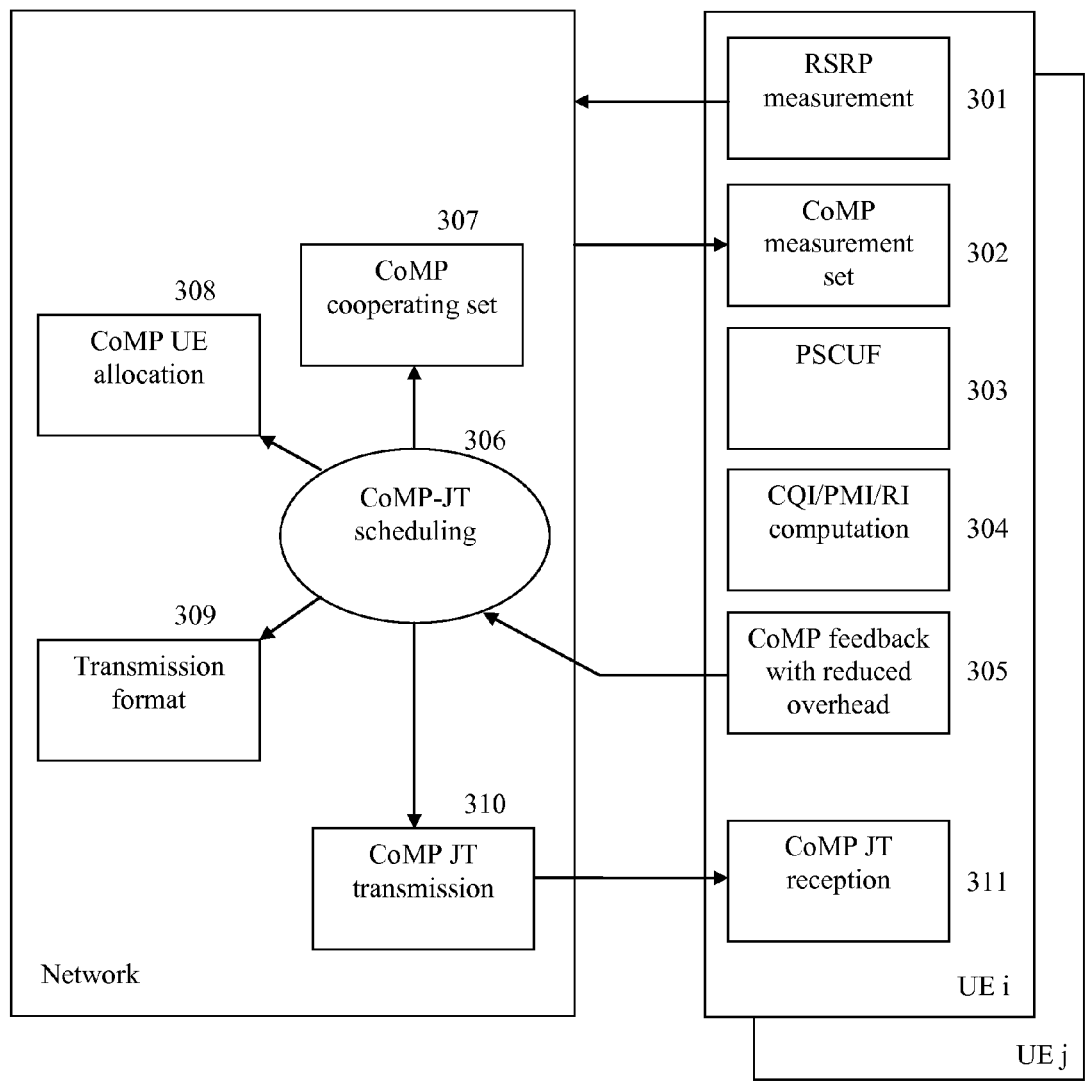
FIG. 3 depicts feedback and scheduling for CoMP JT transmission and reception.

2. Flow Chart of Proposed Feedback Schemes, Scheduling Module and Transmit/Receive Flow FIG. 3 represents proposed feedback schemes, scheduling module and the transmit/receive flow of CoMP JT.

At each UE, reference signal received power (RSRP) is measured in block 301 and fed back to the network and more specifically to a base station or eNodeB. The network determines a CoMP measurement set for each UE and signals the set to the UE in block 302, based on the feedback. Whether a UE is CoMP UE or non-CoMP UE is determined at this step. A step called pre-scheduling CoMP UE fallback (PSCUF) is then conducted, in block 303, where a CoMP UE falls back to non-CoMP UE (single cell transmission) if the measured CoMP aggregated SINR has no gain over single-cell per point SINR. The channel quality and direction information (e.g. CQI, PMI, RI, etc.) is then computed in block 304, based on the UE categories such as CoMP UE or non-CoMP UE. The CQI/PMI/RI is then fed back to the network in block 305 as the input of the scheduler. The proposed scheduling in block 306 has the output of at least one of CoMP UE allocation in block 308, a CoMP cooperating set in block 307, and a transmission format in block 309. The CoMP JT transmission in block 310 and reception in block 311 are then performed based on the scheduling scheme and feedback options.

3. Feedback for CoMP Joint Transmission with Lower Signaling Overhead

We assume an implicit channel state information (CSI) feedback scheme where feedback of a transmission format (e.g. CQI, PMI, RI, etc.) derived using hypotheses of different transmission and reception processing is performed for all the UEs within the CoMP measurement set. Each UE is classified as a CoMP UE or non-CoMP UE in a semi-static manner based on long-term SINR measurements in the form of reference signal receive power (RSRP).

3.1 CSI Feedback for CoMP-JT

For CoMP UE k with the size of its CoMP measurement set larger than one, the feedback contains, for example, at least one of (1) a rank-1 PMI for each TP in its measurement set $V_k$, (2) one aggregate CQI computed assuming SU joint transmission hypothesis and including interference only from the TPs outside CoMP measurement set, (3) one fall-back CQI assuming SU transmission from only fall back serving TP and including interference from all other TPs, and (4) inter-point phase information for a coherent joint transmission. Note that non-coherent JT is a special case when 0-bit inter-point phase feedback is applied, which is helpful in reducing the signaling overhead.

We propose and investigate different rules to determine per-TP PMI and phase for each CoMP UE to reach a complexity and performance tradeoff including, for example, (1) joint PMI and joint phase; (2) serving cell optimized PMI and joint PMI/phase among other intra-COMP TPs; and (3) independent PMI and joint phase.

Joint PMI and Joint Phase

In this rule, joint optimization of all PMIs and phases to maximize aggregate CQI. This is optimal with respect to aggregate CQI but not fallback single TP CQI. One apparent drawback of this method is its high complexity and suboptimality when fall-back single TP is eventually scheduled.

Serving Cell Optimized PMI and Joint PMI/Phase Among Other Intra-COMP TPs

A rule where fall back single TP CQI is optimized first and then remaining PMIs and phases are selected to maximize aggregate CQI. This is optimal with respect to fallback single TP CQI but not aggregate CQI.

Independent PMI and Joint Phase

In this rule, PMIs are independently selected assuming SU transmission from the respective TPs with muting of other intra-CoMP set TPs. The phases are then selected by maximizing the aggregate CQI using the selected PMIs. This rule has the lowest complexity.

3.2 Pre-Scheduling CoMP UE Fallback

UE is determined as a CoMP UE based on long term RSPR from the TPs the cluster. We propose a method called pre-scheduling CoMP UE fall-back (PSCUF) to reduce the feedback overhead without introducing system performance loss. Specifically, at the feedback stage, a CoMP UE can further determine or be indicated by the network whether it gives feedback as a CoMP UE or a non-CoMP UE based on a short-term SINR.

A detailed procedure of PSCUF is described in the Further System Details section.

4. Optimal Multi-Cell Scheduling for SU JT CoMP

The original multi-cell scheduling problem is strongly NP (non-deterministic polynomial-time) hard, which includes the maximum weight independent set problem. We propose a scheduling procedure in which weighted sum rate has a guaranteed performance of the optimal solution.

A detailed algorithm for the scheduling procedure is elaborated in the Further System Details section.

The proposed solution can have, for example, some of the following features:

(1) The proposed PSCUF scheme reduces the feedback overhead by CoMP UE fallback.

(2) The proposed scheduling achieves a guaranteed performance as a ratio of that of an optimal solution.

(3) The proposed CQI/PMI/RI computation scheme has low complexity.

(4) The proposed scheme can be easily extended to the scenario that MU-MIMO.

One or more of the following features and steps enable the efficiency of the proposed rate adaptation scheme:

(1) The proposed PSCUF allows the UE to skip CoMP when UE detects that CoMP has no performance gain over single-cell transmission.

(2) The proposed scheduling algorithm achieves a guaranteed performance of the original NP-hard scheduling problem.

(3) The proposed CQI/PMI/RI computation achieves better performance.

(4) The proposed CoMP transmission/reception achieves good performance at lower feedback overhead.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

Further system details

Coordinated multi-point (CoMP) transmission, being standardized in Third Generation Partnership Project Long Term Evolution Advanced (3GPP LTE-Advanced), allows multi-cell cooperative processing to mitigate inter-cell interference (ICI) and the system to operate at higher effective signal-to-interference-plus-noise ratios (SINRs). Joint transmission (JT) CoMP transmission increases the user throughput especially cell edge users by jointly coordinating the transmission or receptions of user signals from multiple cooperating transmission points (TP). The benefits of JT CoMP come at the cost of increased radio feedback and backhaul overhead. In this paper, we propose and investigate effective CoMP JT feedback schemes including non-coherent JT transmission and pre-scheduling CoMP user equipment fallback (PSCUF) scheme with much reduced signaling overhead while maintaining the throughput advantage of joint transmission, especially for cell edge user equipments (UEs). Based on the proposed feedback, we develop an effective multi-cell scheduling which provides an optimal performance subject to the rank fixing constraints. Simulation results reveal that with the proposed feedback schemes and scheduling algorithm, CoMP JT achieves significant cell-edge throughput gain over single cell transmission at the cost of much reduced feedback and backhaul overhead.

1 Introduction

Future broadband wireless systems are envisaged to support higher data-rate transmissions and experience stronger ICI due to the aggressive frequency reuse, operation in smaller cell size and heterogenous networks (HetNet) and adoption of advanced MIMO schemes [1]. CoMP which involves cooperative processing or joint transmission between base stations has been identified as one of the key techniques for mitigating ICI in future communication systems [2].

Downlink CoMP is mainly categorized into two classes: joint transmission (JT) and coordinated scheduling/ coordinated beamforming (CS/CB). In the class of JT, data to one UE is simultaneously transmitted from multiple TPs, to increase the desired signal quality. In CS/CB, base stations avoid severe ICI by conducting joint scheduling and beamforming. The performance of CoMP highly depends on the available channel information of the UEs within the cooperating cell set and scheduling algorithms. In FDD system, channel information of UEs are obtained in a form of channel direction and quality feedback such as channel quality index (CQI), precoding matrix index (PMI) and rank index (RI). Both CoMP schemes require significant backhaul overhead and feedback overhead [3], which is one of the major drawbacks related to CoMP.

In this paper, we target to reduce the CoMP feedback signaling overhead while keeping the advantage of multi-cell cooperative processing for cell-edge users. We propose and investigate different feedback schemes with lower signaling overhead such as non-coherent JT and pre-scheduling CoMP UE fallback (PSCUF). With non-coherent JT, no phase adjustment feedback is needed for joint transmission. With PSCUF, a scheme dynamically allowing a CoMP UE to skip CoMP feedback and fallback to single cell transmission is enabled without incurring throughput loss. Based on the proposed feedback and further constrains such as rank-fixing, we develop an optimal scheduling algorithm to achieve CoMP gain at a lower feedback overhead.

The remainder of this paper is organized as follows. Section 2 introduces the system model for CoMP transmission and reception. In section 3, we describe the feedback options with lower overhead for CoMP JT. In section 4, a multi-cell scheduling algorithm is developed to for single user (SU) CoMP JT with optimal performance and affordable complexity. Section 5 presents the simulation assumption and results and concluding remarks are made in Section

2 System Description

We consider a cluster layout consisting of $M$ transmission points (TPs). Each TP can be either a macro-cell base station (BS) or a low power remote radio head (RRH). Each TP is equipped with $n_T$ transmit antennas and each user equipment (UE) has $n_R$ receive antennas. Therefore, the CoMP network could be a homogeneous network consisting of all macro-cell BSs, i.e., homogeneous network, as shown in Fig 1 or a heterogeneous network (HetNet) which is mixture of macro-cell BSs and lower power RRHs as shown in Fig. 2. For simplicity, we consider single-user (SU) joint-transmission (JT) CoMP scheme, in which maximally only one UE can be scheduled for any resource element (RE)[1] within the cluster. Thus the UE will experience only the co-channel interference from the TPs outside its CoMP cooperating set.

The received signal for the target UE at a RE over which data is transmitted to that UE, is given by $$y = \sum_{i=1}^{M} \sqrt{\frac{\rho_i}{r_i}} H_i W_i s_i + \tilde{H}\tilde{W}\tilde{s} + n. \qquad (1)$$

where $H_i \in C^{n_R \times n_T}, i = 1, \cdots, M$ denotes the channel seen by the UE from the $i$th transmission point in its CoMP measurement set, where the composition of the CoMP measurement set is decided in a semi-static manner by the network controller based on long-term signal-to-interference-plus-noise (SINR) ratio measurements and is held fixed across many sub-frames; $\rho_i$ is the the transmission power or energy per resource element (EPRE) used by the $i$th transmission point; $W_i$ and $s_i$ are the precoding matrix (with $r_i$ columns) and the data symbol vector transmitted by the $i$th transmission point; $\tilde{H}, \tilde{W}$, and $\tilde{s}$ are the composite channel matrix, precoding matrix, and data symbol vector transmitted by all the other transmission points outside the UE's CoMP measurement set.

Using the terminologies defined in 3GPP Release 11 [3], a CoMP measurement set is a set of TPs about which channel state/statistical information related to their link to the UE

---

[1] An RE refers to a basic time-frequency resource unit, i.e., a subcarrier within one OFDM symbol in OFDMA systems.

is measured and a CoMP cooperating set is set of (geographically separated) transmission points directly participating in data transmission to a UE. Denote the CoMP cooperating set of user $k$ as $\mathcal{S}_k$ and the CoMP measurement set of user $k$ as $\mathcal{V}_k$, where CoMP cooperating set is a subset of CoMP measurement set and CoMP measurement set a subset of the cluster, i.e., $\mathcal{S}_k \subseteq \mathcal{V}_k$ and $\mathcal{V}_k \subseteq \{1, \cdots, M\}$. Denote $|\mathcal{S}|$ as the cardinality of a set $\mathcal{S}$.

When performing joint transmission (JT) as the COMP scheme, the same data symbols are transmitted through multiple transmission points in the CoMP cooperating set. Then, we can rewrite the signal model in (1) based on the CoMP cooperating set $\mathcal{S}_k$, i.e., $$y_k = \sum_{i \in \mathcal{S}_k} \sqrt{\frac{p_i}{r_k}} H_{i,k} W_{i,k} e^{j\varphi_i} s + \tilde{H}\tilde{W}\tilde{s} + n, \tag{2}$$

where $\varphi_i$ is the coherent phase adjustment to improve the SINR for coherent JT. We assume that the serving cell BS with index 1 is always present in $\mathcal{S}_k$ for the JT. We then fix $\varphi_1 = 0$. In non-coherent JT, we do not need the feedback on $\varphi_i$, i.e., $\varphi_i = 0 \ \forall i \in \mathcal{S}_k$ is applied. As specified in later section, a common transmission rank $r_k$ restriction is employed to all REs assigned to user $k$ and thus all $W_{i,k}$, $i \in \mathcal{S}_k$ have same rank. Define $H_{\mathcal{S}_k} \triangleq \sum_{i \in \mathcal{S}_k} \sqrt{\frac{p_i}{r_k}} H_{i,k} W_{i,k} e^{j\varphi_i}$. The SINR for the $j^{th}$ layer assuming an minimum mean square error with interference rejection capability (MMSE-IRC) [4] receiver at UE is then given by $$\gamma_{\mathcal{S}_k,j} = \frac{F^\dagger_{\mathcal{S}_k,j} H_{\mathcal{S}_k,j} H^\dagger_{\mathcal{S}_k,j} F_{\mathcal{S}_k,j}}{F^\dagger_{\mathcal{S}_k,j} \left( \sum_{j',j' \neq j} H_{\mathcal{S}_k,j'} H^\dagger_{\mathcal{S}_k,j'} + R \right) F_{\mathcal{S}_k,j}}, \tag{3}$$

where $F_{\mathcal{S}_k}$ denotes the receiver filter on the signal in (2) for CoMP JT transmissions and $F_{\mathcal{S}_k,j}$ the $j$-th column of $F_{\mathcal{S}_k}$; $R$ is the covariance of the interference outside CoMP set plus noise, i.e., $$R = \tilde{H}\tilde{W}\tilde{W}^\dagger \tilde{H}^\dagger + I. \tag{4}$$

Note that in the feedback stage, a UE has no information on the precoding matrix to be scheduled and applied from the interfering TPs. We will assume an identity precoding matrix for the interfering TPs to compute interference in our simulation, i.e., $R = \tilde{H}^\dagger \tilde{H}^\dagger + I$.

Thus the corresponding rate for the CoMP JT transmission of UE $k$ at a given RE and time slot is given by $$\eta_k = \sum_{j=1}^{r_k} \log(1 + \gamma_{s_k,j}) \qquad (5)$$

3 Feedback for CoMP Joint Transmission

We assume an implicit channel state information (CSI) feedback scheme where feedback of a transmission format (e.g. CQI/PMI/RI) derived using hypotheses of different transmission and reception processing is performed for all the UEs within the CoMP measurement set. Each UE is classified as a CoMP UE or non-CoMP UE in a semi-static manner based on long-term SINR measurements in the form of reference signal receive power (RSRP). In addition, fall-back serving transmission point (TP) for each CoMP UE is also decided in a semi-static manner.

3.1 Determination of CoMP Measurement Set and Cooperating Set

The network (a centralized BS or eNodeB) determines UE specific CoMP measurement for each UE based on the measured RSRP for all cells within the cluster. Specifically, for any UE $k$, a transmission point $i$ (non-serving cell) is added into the CoMP measurement set $\mathcal{V}_k$ only if the RSRP of the corresponding cell $RSRP_i$ is within $\beta$-dB offset of the RSRP of the serving cell, i.e., $$|RSRP_i - RSRP_0| \leq \beta, \qquad (6)$$

where $RSRP_0$ denotes the RSRP of the serving cell. Note that $\mathcal{V}_k$ is a subset of the cells within the cluster $\mathcal{V}_k \subseteq \{1 : M\}$ and we assume $\mathcal{V}_k$ has a size of at-most 3 TPs, i.e., $|\mathcal{V}_k| \leq 3$. For notational simplicity, we assume the first element in $\mathcal{V}_k$ corresponding to the serving cell or anchor TP ($\mathcal{V}_k^{(1)}$). Thus UE $k$ is a CoMP UE when $|\mathcal{V}_k| > 1$ and a non-CoMP UE when $|\mathcal{V}_k| = 1$.

CoMP cooperating set will be determined by the MAC scheduler based on the instantaneous channel state information (in the form of CQI/PMI/RI feedback) of the TPs in the CoMP measurement set.

3.2 CSI feedback for CoMP-JT

For a non-CoMP UE with the size of its CoMP measurement set being one, single TP feedback is performed as done in Release 8 LTE which contains (1) a rank indicator indicating preferred rank $R \leq \min\{n_R, n_T\}$, (2) One rank-R PMI and a CQI assuming SU transmission from the serving cell including interference from all other TPs.

For a CoMP UE $k$ with the size of its CoMP measurement set larger than one, the feedback contains (1) a rank-1 PMI for each TP in its measurement set $\mathcal{V}_k$, (2) One aggregate CQI computed assuming SU joint transmission hypothesis and including interference only from the TPs outside CoMP measurement set, (3) One fall-back CQI assuming SU transmission from only fall back serving TP and including interference from all other TPs and (4) Inter-point phase information for a coherent joint transmission. Note that non-coherent JT is a special case when 0-bit inter-point phase feedback is applied.

We propose and investigate different rules to determine per-TP PMI and phase for each CoMP UE to reach a complexity and performance tradeoff.

Joint PMI and joint phase In this rule, joint optimization of all PMIs and phases to maximize aggregate CQI. This is optimal with respect to aggregate CQI but not fallback single TP CQI. One apparent drawback of this method is its high complexity and suboptimality when fall-back single TP is eventually scheduled.

Serving cell optimized PMI and joint PMI/phase among other intra-COMP TPs A rule where fall back single TP CQI is optimized first and then remaining PMIs and phases are selected to maximize aggregate CQI. This is optimal with respect to fallback single TP CQI but not aggregate CQI.

Independent PMI and joint phase In this rule, PMIs are independently selected assuming SU transmission from the respective TPs with muting of other intra-CoMP set TPs. The phases are then selected by maximizing the aggregate CQI using the selected PMIs. This rule has the lowest complexity.

3.3 Pre-scheduling CoMP UE Fallback

As is shown, a COMP UE involves much higher feedback overhead than a non-CoMP UE since the former needs to feedback to the network side the CSI related to several TPs plus an aggregated CQI and individual phase information.

So far, a UE is determined as a CoMP UE based on long term RSPR from the TPs the cluster. We propose a method called pre-scheduling CoMP UE fall-back (PSCUF) to reduce the feedback overhead without introducing system performance loss. Specifically, at the feedback stage, a CoMP UE can further determine whether it will feedback as a CoMP UE or non-CoMP based on short-term SINR.

---

[Algorithm 1: Pre-scheduling CoMP UE Fallback ]

1. FOR $k \in [1:K]$

2. IF $|\mathcal{V}_k| > 1$ (UE $k$ is a CoMP UE)

Step 1: Compute serving TP feedback information including $PMI_s/RI_s/CQI_s$.

Step 2: Compute aggregated $CQI_a$ and per-TP PMI $PMI_i$ and phase difference $\varphi_i$ for each TP $i$ in CoMP measurement set $\mathcal{V}_k$.

Step 3:
   IF serving-TP CQI-based total rate $\eta s$ is larger than aggregated CQI-based total rate $\eta a$, i.e. $\eta a(CQIs) \geq \eta a(CQIa)$
      UE skips CoMP and fallback as serving-TP feedback, as is computed in Step 1.
   ELSE
      UE keeps CoMP and feedback CoMP information, as is computed in Step 2.
   END;

3. ELSE (UE $k$ is a non-CoMP UE)

Compute and feedback serving TP feedback information including $PMI_s/RI_s/CQI_s$.

4. END IF

5. END FOR

4 Optimal Multi-cell Scheduling for SU Joint Transmission CoMP

We consider a cluster of $M$ TPs with a total $K$ UEs within the cluster. There are $N$ available physical resource blocks (PRBs) in cluster that are available for resource allocation. We assume a centralized scheduler which allocates the PRB resources and transmission formats (transmit precoding matrices, modulations and coding rates) to the users within the cluster in order to optimize the cluster weighted sum rate. The input of the scheduler consists of the available PRBs and the users' channel quality information including (CQI,PMI and RI) fed back from the $K$ UEs within the cluster. Thus the scheduling performance highly depends on the CSI feedback options, as described in Section 3.3.

Let $R = \max(n_R, n_T)$ denote the maximum rank that any user can be assigned. Let $k^{(i)}$ be the user scheduled by the $i^{th}$ TP and let $r^{(i)}$ be the rank employed by the TP to serve that user. We let $\boldsymbol{k} = [k^{(1)}, \cdots, k^{(M)}]$, $\boldsymbol{r} = [r^{(1)}, \cdots, r^{(M)}]$ denote the user and the rank allocation vectors, respectively. Let $\underline{\mathcal{K}}$ denote the set of all vectors $\boldsymbol{k} = [k^{(1)}, \cdots, k^{(M)}] : k^{(i)} \in \{0, 1, \cdots, K\} \; \forall \, i$, where we let user 0 denote a *dummy* user. Similarly, let $\underline{\mathcal{R}}$ denote the set of all vectors $\boldsymbol{r} = [r^{(1)}, \cdots, r^{(M)}] : r^{(i)} \in \{1, \cdots, R\} \; \forall \, i$. Then, the resource allocation problem can be formulated as follows.

$$\max_{\{\mathcal{X}(n,\boldsymbol{k},\boldsymbol{r})\in\{0,1\}\}} \sum_{\boldsymbol{k}\in\underline{\mathcal{K}}} \sum_{\boldsymbol{r}\in\underline{\mathcal{R}}} \sum_{n=1}^{N} \eta(n,\boldsymbol{k},\boldsymbol{r})\mathcal{X}(n,\boldsymbol{k},\boldsymbol{r})$$

$$\text{s.t.} \sum_{\boldsymbol{k}\in\underline{\mathcal{K}}} \sum_{\boldsymbol{r}\in\underline{\mathcal{R}}} \mathcal{X}(n,\boldsymbol{k},\boldsymbol{r}) \leq 1, \quad \text{For each RB } n;$$

$$\sum_{r=1}^{R} \max_{i\in\{1,\cdots,M\}} \max_{\substack{\boldsymbol{k}\in\underline{\mathcal{K}},\boldsymbol{r}\in\underline{\mathcal{R}} \\ k^{(i)}=k \, \& \, r^{(i)}=r}} \max_{n\in\{1,\cdots,N\}} \{\mathcal{X}(n,\boldsymbol{k},\boldsymbol{r})\} \leq 1, \quad \text{For each user } k \neq 0, \tag{7}$$

where we let $\eta(n, \boldsymbol{k}, \boldsymbol{r})$ denote the weighted sum rate that can be achieved on RB $n$ upon choosing $\boldsymbol{k}, \boldsymbol{r}$ as user and rank allocation vectors, respectively. This rate assumes that an optimal set of precoders is employed corresponding to this choice of allocation vectors. Notice that in the objective function of (7) we have implicitly imposed that each TP can serve atmost one user in each RB. On the other hand, on each RB $n$ multiple TPs can serve the same user since we allow for the possibility of a vector $\boldsymbol{k} \in \underline{\mathcal{K}} : k^{(i)} = k^{(j)}$ for some $i \neq j$. Further, one or more TPs can remain silent by choosing the dummy user. The first constraint in (7) enforces that at-most one configuration is used on any RB, where by configuration we mean a particular choice of $\boldsymbol{k}, \boldsymbol{r}$. The second constraint in (7) enforces the per-user common rank constraint that each (non dummy) user can be served using at-most one rank. We note that while (7) is an accurate formulation, it includes the maximum weight independent set problem, a strongly NP hard problem, as a special case and hence is very hard to even approximately solve.

In order to simply (7) we employ the following approximation. In particular, for any $\boldsymbol{k}, \boldsymbol{r}$ such that $k^{(i)} = k^{(j)} \Rightarrow r^{(i)} = r^{(j)}, \forall i, j$, we define $\mathcal{U}_{\boldsymbol{k}}$ to be the set of distinct users in $\boldsymbol{k}$ and for each $k \in \mathcal{U}_{\boldsymbol{k}}$, let $\mathcal{S}_k, r$ denote the set of TPs selected to serve user $k$ and the rank used to serve user $k$, respectively. Then, we assume $$\eta(n, \boldsymbol{k}, \boldsymbol{r}) \approx \sum_{k \in \mathcal{U}_{\boldsymbol{k}}} \eta_k(n, \mathcal{S}_k, r) \tag{8}$$

Note that the rate $\eta_k(n, \mathcal{S}_k, r)$ is computed assuming a random *isotropic* interference from TPs in $\{1, \cdots, M\} \setminus \mathcal{S}_k$. As a result of this assumption we do not have to account for the exact precoders used by the interfering (non data serving) TPs which allows for the decoupling across users.

With this understanding, we now proceed to reformulate (7). Denote $\mathcal{V}_k$ to be the reported CoMP measurement set of user $k$, as described in Section 3.1. Note that $\mathcal{V}_k$ is a subset of all the TPs within a cluster, i.e., $\mathcal{V}_k \subseteq \{1, \cdots, M\}$. Note that on any RB the CoMP cooperating set of user $k$, denoted by $\mathcal{S}_k$, is the set of all TPs which serve data to the user, and can be chosen as any subset of $\mathcal{V}_k$. The resource allocation problem can now be formulated as $$\max_{\{\mathcal{X}(n,r,\mathcal{S}_k) \subset \{0,1\}\}} \sum_{k=1}^{K} \sum_{\mathcal{S}_k \subseteq \mathcal{V}_k} \sum_{n=1}^{N} \sum_{r=1}^{R} \alpha_k \eta_k(n, r, \mathcal{S}_k) \mathcal{X}(n, r, \mathcal{S}_k)$$

$$\text{s.t.} \sum_{k=1}^{K} \sum_{\mathcal{S}_k \subseteq \mathcal{V}_k : m \in \mathcal{S}_k} \sum_{r=1}^{R} \mathcal{X}(n, r, \mathcal{S}_k) \leq 1, \text{For each TP } m;$$

$$\sum_{\mathcal{S}_k \subseteq \mathcal{V}_k} \sum_{r=1}^{R} \mathcal{X}(n, r, \mathcal{S}_k) \leq 1, \text{For each user } k \text{ and each RB } n;$$

$$\sum_{r=1}^{R} \max_{\mathcal{S}_k \subseteq \mathcal{V}_k} \max_{n \in \{1, \cdots, N\}} \{\mathcal{X}(n, r, \mathcal{S}_k)\} \leq 1, \text{For each user } k, \tag{9}$$

where $\alpha_k$ is a user dependent weight.

Next, we propose a procedure detailed in Algorithm 1 in order to solve (9).

---
Algorithm 1 Suboptimal solution
---
Initialize: per-user weights and channels.
for each RB $n = 1, \ldots, N$ do
  (Sub-optimally) Solve the following problem:

$$\max_{\{\mathcal{X}_k(n,r,\mathcal{S}_k)\in\{0,1\}\}} \sum_{k=1}^{K} \sum_{\mathcal{S}_k \subseteq \mathcal{V}_k} \sum_{r=1}^{R} \alpha_k \eta_k(n,r,\mathcal{S}_k) \mathcal{X}_k(n,r,\mathcal{S}_k)$$

$$\text{s.t.} \sum_{k=1}^{K} \sum_{\mathcal{S}_k \subseteq \mathcal{V}_k : m \in \mathcal{S}_k} \sum_{r=1}^{R} \mathcal{X}_k(n,r,\mathcal{S}_k) \leq 1, \text{For each TP } m;$$

$$\sum_{\mathcal{S}_k \subseteq \mathcal{V}_k} \sum_{r=1}^{R} \mathcal{X}_k(n,r,\mathcal{S}_k) \leq 1, \text{For each user } k, \quad (10)$$

end for
for each user $k = 1, \ldots, K$ do
  Collect the scheduling decisions made for user $k$ comprising of the set of RBs, $\mathcal{R}_k$, on which it is selected to be served along with the set of TPs chosen to serve it, $\mathcal{S}_k^{(n)}, n \in \mathcal{R}_k$, on each such RB.
  Consider each rank $r \in \{1, \cdots, R\}$ and compute $\sum_{n \in \mathcal{R}_k} \eta_k(n, r, \mathcal{S}_k^{(n)})$, the sum rate achievable across all RBs in $\mathcal{R}_k$ using a common rank $r$.
  Determine the rank $\hat{r}_k$ which yields the maximum rate and select $\hat{r}_k, \mathcal{R}_k, \{\mathcal{S}_k^{(n)}\}_{n \in \mathcal{R}_k}$ as the scheduling decision for user $k$.
end for
Output the scheduling decisions for all users.

---

We now analyze the performance of Algorithm 1 for a representative system with maximum per-user rank $R = 2$. We make the following assumption on the per-user rates $$\eta_k(n,\mathcal{S}_k,1) \geq \alpha_{1,2}\eta_k(n,\mathcal{S}_k,2) \ \& \ \eta_k(n,\mathcal{S}_k,2) \geq \alpha_{2,1}\eta_k(n,\mathcal{S}_k,1), \forall \mathcal{S}_k \subseteq \mathcal{V}_k, \forall n, \quad (11)$$

where $\alpha_{1,2}, \alpha_{2,1}$ are some positive constants. Further, we assume that the per-RB problem in (10) can be solved using with an approximation guarantee $\Gamma \geq 1$, i.e. the weighted sum rate resulting from the obtained sub-optimal solution is no less than $1/\Gamma$ times the optimal per-RB weighted sum rate.

Proposition 4.1 *The weighted sum rate obtained using the output of Algorithm 1 is no less than* $\frac{1-\alpha_{1,2}\alpha_{2,1}}{\Gamma(2-\alpha_{1,2}-\alpha_{2,1})}$ *times optimal weighted sum rate for (7).*

We also evaluate a simplified algorithm where an exhaustive search is done for CoMP scheduling based on the single cell scheduling result, as elaborated in Algorithm II.

---

Algorithm 2 Multi-cell scheduling suboptimal algorithm

1. FOR each TP $i \in [1:M]$ within the cluster, DO

Perform a single cell scheduling among all the UEs associated with TP $i$. The output is the selected UEs and their associated transmission format (precoder and MCS) which give a highest weighted sum rate over $N$ PRBs at TP $i$.

2. END FOR

3. FOR each PRB $n \in [1:N]$, DO select $p$ UEs (indexed by $k_1, k_2, ..., k_p$) giving the highest weighted sum rate across the $M$ TPs.

$$(p^*, k_1^*, k_2^*, ..., k_p^*) = \arg_{p,k_1,k_2,...,k_p} \max \sum_{i=1}^{p} \alpha_{k_i} \eta_{k_i}(n, r_{k_i}, \mathcal{S}_{k_i}) \qquad (12)$$

$$\text{s.t. } \mathcal{S}_{k_1} \cup \mathcal{S}_{k_2} ... \cup \mathcal{S}_{k_p} = [1:M];$$
$$\mathcal{S}_{k_i} \cap \mathcal{S}_{k_j} = \emptyset, i \neq j;$$
$$\mathcal{S}_{k_i} \in \{\mathcal{V}_{k_i}^{(1)}, \mathcal{V}_{k_i}\}, i = 1, ..., p.$$

where $\mathcal{S}_{k_i}$ indicates the CoMP cooperating set of UE $k_i$. First, we perform an exhaustive search among all the CoMP UEs within the cluster. Then we choose the UEs with non-overlapping CoMP cooperating sets $\mathcal{S}_i \cap \mathcal{S}_j = \emptyset$ which gives the highest weighted sum rate across all TPs within the cluster. Note that if a single cell UE (non-CoMP UE) is scheduled, the optimal SU scheduling result in Step 1 is directly applied.

4. END FOR

5. Output UE allocations and their associated transmission format for each PRB and TP.

---

5 Simulation Assumption and Results

In this section, we evaluate the performance of CoMP joint transmission based on the proposed feedback and SU-MIMO multi-cell scheduling through system level simulation. We use the evaluation model agreed for performance evaluation of CoMP in 3GPP Radio Access network Working Group 1 (RAN WG1) [5].

| Parameter | Value used for evaluation |
|---|---|
| Deployment scenarios | Heterogeneous network with low power RRHs within the macrocell coverage. Coordination area as 1 Macro-cell with 4 low-power nodes |
| Transmission scheme | SU-MIMO with rank adaptation, JT-CoMP |
| Channel model | ITU UMa for macrocell and UMi for LPN |
| CQI/PMI feedback interval | 5 TTIs |
| Feedback delay | 4 TTIs |
| Channel state information feedback | JT-CoMP: Individual per-point feedback + inter-point phase difference + aggregated CQI from CoMP measurement set |
| UE receiver assumption | MMSE-IRC |
| Modeling of interference outside the area | No interference within CoMP cooperating set |
| Threshold for cell-edge | 9 dB |
| UE decision Channel estimation | Ideal |

Table 1: Simulation Parameters

5.1 Simulation Assumptions

The major simulation assumptions are summarized in Table 5.1. The simulations were carried over applying a full buffer traffic model and the results are obtained over $N_{TTI} = 600$ TTIs.

5.2 Simulation Results

Note that different feedback assumptions have impact on the feedback overhead, scheduling complexity and system performance. We evaluate the system level performance of coherent CoMP-JT for different phase quantization, CoMP-JT with PSCUF and without PSCUF.

In Table 2, the system throughput performance is evaluated for both cross-polarization (Xpol) and uniform linear array (ULA) for both CoMP joint transmission. Non-CoMP single cell transmission is evaluated as a baseline. As is shown, with CoMP JT, the system achieves over 20% ~ 25% cell gain gains with a slight cell average loss. Note that we assume a power MMSE-IRC receiver which in fact reduce CoMP gains over non-CoMP schemes.

Table 3 gives the results of CoMP joint transmission with different bits of phase quantization. The results reveal that inter-point phase feedback in coherent JT CoMP has no significant gain over non-coherent JT CoMP. With 4-bit phase, the coherent CoMP JT achieves only 2.36% and 0.35% gain respectively for cell average throughput and cell edge

| Antenna polarization | cell average CoMP (b/Hz/s) | cell edge CoMP (b/Hz/s) | cell average non-CoMP (b/Hz/s) | cell edge non-CoMP (b/Hz/s) | cell average gain (CoMP vs non-CoMP) | cell edge gain (CoMP vs non-CoMP) |
|---|---|---|---|---|---|---|
| X-pol | 13.840 | 0.115 | 14.076 | 0.092 | -1.7% | 24.5% |
| ULA | 14.367 | 0.128 | 14.608 | 0.103 | -1.7% | 23.8% |

Table 2: Throughput performance of CoMP-JT and non-CoMP SU MIMO

| Phase quantization CoMP-JT | 4-bit phase | 3-bit phase | 2-bit phase | non-coherent (0-bit) |
|---|---|---|---|---|
| Cell average throughput (b/Hz/s) | 14.3705 | 14.365 | 14.3665 | 14.319 |
| Cell edge throughput throughput (b/Hz/s) | 0.13 | 0.1286 | 0.1276 | 0.127 |
| Cell average gain (compared to 0-bit) | 0.36% | 0.32% | 0.33% | 0 |
| Cell edge gain (compared to 0-bit) | 2.36% | 1.26% | 0.47% | 0 |

Table 3: Performance of coherent JT with different phase quantization bits throughput over non-coherent CoMP JT. This means non-coherent SU JT CoMP captures almost all available gain even upon assuming ideal channel estimation.

In Table 4, we evaluate the performance of a feedback reduction scheme - PSCUF, in which a CoMP UE can dynamically decide to feedback as single cell fall-back or CoMP under some conditions. As seen from the simulation, PSCUF almost incurs no degradation to system throughput performance but it saves huge feedback overhead.

6 Conclusion

In this paper, we propose and investigate effective CoMP JT feedback schemes with much reduced feedback overhead. We develop an effective multi-cell scheduling which provides an optimal performance based on proposed feedback and rank-fixing constraints. Simulation reveals that with the proposed feedback schemes and scheduling algorithm, CoMP JT achieves significant cell-edge throughput gain over single cell transmission.

|  | cell average throughput (b/Hz/s) | cell edge throughput (b/Hz/s) |
| --- | --- | --- |
| PSCUF | 2.7679 | 0.115 |
| non-PSCUF | 2.7684 | 0.1132 |
| performance difference | -0.02% | 1.59% |

Table 4: Performance with and without pre-scheduling CoMP UE fallback

What is claimed is:

1. A method implemented in a user equipment (UE) used in an orthogonal frequency division multiple access (OFDMA) wireless communications system supporting coordinated multi-point (CoMP) joint transmission (JT), the method comprising:
    measuring reference signal received power (RSRP);
    transmitting, to a network, first feedback on the RSRP;
    receiving, from the network, a CoMP measurement set;
    conducting pre-scheduling CoMP UE fallback according to the CoMP measurement set;
    computing channel quality and direction information according to a UE category; and
    transmitting, to the network, second feedback on the channel quality and direction information,
    wherein the pre-scheduling CoMP UE fallback comprises:
    measuring a CoMP aggregated signal-to-interference-plus-noise ratio (SINR) or channel quality index (CQI); and
    falling back from a CoMP UE to a non-CoMP UE if a total rate based on the measured CoMP aggregated SINR or CQI has no gain over a total rate based on a single-cell per point SINR or CQI, and
    wherein the second feedback includes
    a rank-1 precoding matrix index (PMI) for each transmission point (TP) in the CoMP measurement set,
    an aggregate channel quality index (CQI) computed assuming single user (SU) JT hypothesis and including interference only from TPs outside the CoMP measurement set,
    a fallback CQI assuming SU transmission from a fallback serving TP and including interference from other TPs other, and
    inter-point phase information for coherent joint transmission.

2. The method as in claim 1, wherein the second feedback includes at least one of a channel quality index (CQI), a precoding matrix index (PMI), and a rank index (RI).

3. The method as in claim 1, wherein the UE category includes a CoMP UE and a non-CoMP UE.

4. A method implemented in an network used in an orthogonal frequency division multiple access (OFDMA) wireless communications system supporting coordinated multi-point (CoMP) joint transmission (JT), the method comprising:
    receiving, from a user equipment (UE), first feedback on reference signal received power (RSRP);
    determining a CoMP measurement set according to the first feedback;
    transmitting, to the UE, the CoMP measurement set;
    receiving, from the UE, second feedback on channel quality and direction information; and
    scheduling CoMP JT according to the second feedback,
    wherein the UE conducts pre-scheduling CoMP UE fallback according to the CoMP measurement set, and
    wherein the pre-scheduling CoMP UE fallback comprises:
    measuring a CoMP aggregated signal-to-interference-plus-noise ratio (SINR) or channel quality index (CQI); and
    falling back from a CoMP UE to a non-CoMP UE if a total rate based on the measured CoMP aggregated SINR or CQI has no gain over a total rate based on a single-cell per point SINR or CQI, and
    wherein the second feedback includes
    a rank-1 precoding matrix index (PMI) for each transmission point (TP) in the CoMP measurement set,
    an aggregate channel quality index (CQI) computed assuming single user (SU) JT hypothesis and including interference only from TPs outside the CoMP measurement set,
    a fallback CQI assuming SU transmission from a fallback serving TP and including interference from other TPs other, and
    inter-point phase information for coherent joint transmission.

5. The method as in claim 4, wherein the scheduling outputs at least one of CoMP UE allocation, a CoMP cooperating set, and a transmission format.

6. The method as in claim 4, wherein the second feedback includes at least one of a channel quality index (CQI), a precoding matrix index (PMI), and a rank index (RI).

7. The method as in claim 4, wherein the network comprises a base station.

8. A method implemented in an orthogonal frequency division multiple access (OFDMA) wireless communications system supporting coordinated multi-point (CoMP) joint transmission (JT), the method comprising:
    measuring reference signal received power (RSRP);
    transmitting, from a user equipment (UE) to a network, first feedback on the RSRP;
    determining a CoMP measurement set according to the first feedback;
    transmitting, from the network to the UE, the CoMP measurement set;
    conducting pre-scheduling CoMP UE fallback according to the CoMP measurement set;
    computing channel quality and direction information according to a UE category;
    transmitting, from the UE to the network, second feedback on channel quality and direction information; and
    scheduling CoMP JT according to the second feedback,
    wherein the pre-scheduling CoMP UE fallback comprises:
    measuring a CoMP aggregated signal-to-interference-plus-noise ratio (SINR) or channel quality index (CQI); and
    falling back from a CoMP UE to a non-CoMP UE if a total rate based on the measured CoMP aggregated SINR or CQI has no gain over a total rate based on a single-cell per point SINR or CQI, and
    wherein the second feedback includes
    a rank-1 precoding matrix index (PMI) for each transmission point (TP) in the CoMP measurement set,
    an aggregate channel quality index (CQI) computed assuming single user (SU) JT hypothesis and including interference only from TPs outside the CoMP measurement set,
    a fallback CQI assuming SU transmission from a fallback serving TP and including interference from other TPs other, and
    inter-point phase information for coherent joint transmission.

9. The method as in claim 8, wherein the second feedback includes at least one of a channel quality index (CQI), a precoding matrix index (PMI), and a rank index (RI).

10. The method as in claim 8, wherein the UE category includes a CoMP UE and a non-CoMP UE.

11. The method as in claim 8, wherein the scheduling outputs at least one of CoMP UE allocation, a CoMP cooperating set, and a transmission format.

12. The method as in claim 8, wherein the network comprises a base station.

* * * * *